United States Patent
Belenkiy et al.

(10) Patent No.: US 12,430,638 B1
(45) Date of Patent: Sep. 30, 2025

(54) SECURELY EMBEDDING MESSAGES IN TRANSACTION RECORDS IN BLOCKCHAIN SYSTEMS

(71) Applicant: CIRCLE INTERNET FINANCIAL, LLC, Boston, MA (US)

(72) Inventors: Mira Belenkiy, Boston, MA (US); Gordon Liao, Boston, MA (US)

(73) Assignee: CIRCLE INTERNET FINANCIAL, LLC, Boston, MA (US)

( * ) Notice: Subject to any disclaimer, the term of this patent is extended or adjusted under 35 U.S.C. 154(b) by 0 days.

(21) Appl. No.: 18/929,556

(22) Filed: Oct. 28, 2024

(51) Int. Cl.
  *G06Q 20/36* (2012.01)
  *G06Q 20/38* (2012.01)

(52) U.S. Cl.
  CPC ....... *G06Q 20/367* (2013.01); *G06Q 20/3829* (2013.01)

(58) Field of Classification Search
  CPC .......................... G06Q 20/367; G06Q 20/3829
  USPC ......................................................... 705/65
  See application file for complete search history.

(56) References Cited

U.S. PATENT DOCUMENTS

| | | | |
|---|---|---|---|
| 2020/0159697 A1* | 5/2020 | Wood | G06F 16/162 |
| 2022/0198444 A1* | 6/2022 | Mee | G06Q 20/389 |
| 2022/0405748 A1* | 12/2022 | Coughlan | G06Q 20/38215 |
| 2023/0214832 A1* | 7/2023 | Hu | G06Q 20/401 |
| | | | 705/75 |
| 2023/0394476 A1* | 12/2023 | Pagani | G06Q 20/3829 |
| 2024/0386489 A1* | 11/2024 | Eutsler | G06Q 20/3825 |

* cited by examiner

*Primary Examiner* — Courtney P Jones
(74) *Attorney, Agent, or Firm* — Patterson + Sheridan, LLP (57) ABSTRACT

Certain aspects of the present disclosure provide techniques for securely embedding messages in transaction records in a blockchain system. An example method generally includes receiving a request to perform a transaction on a blockchain. Generally, the request includes a message payload describing the transaction and an indication of an amount of a token to transfer from a source wallet to a destination wallet on the blockchain. The message payload is encoded. Generally, the encoded message payload has a maximum size associated with a block size on the blockchain. A transaction record including the encoded message payload and the amount of the token to transfer to the destination wallet is generated, and the transaction record is committed to the blockchain.

23 Claims, 6 Drawing Sheets

SECURELY EMBEDDING MESSAGES IN TRANSACTION RECORDS IN BLOCKCHAIN SYSTEMS

INTRODUCTION

Aspects of the present disclosure relate to security in blockchain systems, and more specifically to embedding message data in transaction records in blockchain systems.

BACKGROUND

Blockchains can be used in various decentralized systems to provide a ledger of transactions that have occurred within these decentralized systems. Generally, a blockchain may include a chain of blocks, in which latest block includes some information about a transaction that occurred and a reference to an immediate predecessor block, which may be a hashed value of the previous block. Because the reference to the immediate predecessor block may be a value derived from the immediate predecessor block, verification of the transactions in the blockchain may be performed by ensuring that a hash of a block resolves to the same value as that stored as a reference to the immediate predecessor block in a succeeding block in the blockchain. If there is a mismatch between a computed hash of a block and the hashed value of the block in a succeeding block in the blockchain, validation of the blockchain may fail.

Transaction records in blockchain systems generally identify a receiving party and a sending party for a digital asset (e.g., tokens transferrable on a blockchain system) involved in a transaction. Transaction records may have varying properties and varying formats which may be based, for example, on the digital assets (tokens) based on which transactions are performed. For example, a token exchanged on a blockchain may not support the inclusion of additional data in the transaction records associated with the token. Further, because transaction records on the blockchain are public, blockchains that do support the inclusion of additional data may expose the additional data embedded in these transaction records to anyone with access to transaction data on the blockchain.

BRIEF SUMMARY

Certain embodiments provide a computer-implemented method for securely embedding messages in transaction records in a blockchain system. An example method generally includes receiving a request to perform a transaction on a blockchain. Generally, the request includes a message payload describing the transaction and an indication of an amount of a token to transfer from a source wallet to a destination wallet on the blockchain. The message payload is encoded. Generally, the encoded message payload has a maximum size associated with a block size on the blockchain. A transaction record including the encoded message payload and the amount of the token to transfer to the destination wallet is generated, and the transaction record is committed to the blockchain.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Transactions in cryptocurrency systems may be represented as blocks in a blockchain that track a universe of transactions performed using the cryptocurrency system. In these cryptocurrency systems, processed transactions may not be modified at a later date, thus providing an immutable ledger of the transactions performed using the cryptocurrency system.

Wallets, defined by a private key and public key pair, generally hold assets, such as native or non-native tokens, that can be transferred on a blockchain. In order to perform a transaction on a blockchain, a user generally signs a transaction using a private key associated with a wallet from which assets are being transferred on the blockchain. That is, a transaction generally identifies the assets to be transferred and the public address (or public key) of the transferee wallet to which these assets are transferred, and the transaction is signed using the private key associated with the transferor wallet. Decrypting the signature of the transaction, using the public key associated with the transferor wallet, allows for the transaction to be verified and thus for assets to be transferred from the transferor wallet to the transferee wallet upon verification of the transaction (e.g., by computing nodes participating in processing transactions on the blockchain).

This immutable ledger generally provides a publicly accessible and verifiable record of transactions performed on the blockchain. However, many blockchains may only allow for information about a sending party and a receiving party to be recorded in transaction records on the blockchain.

Because other transaction data may not be included in these transaction records, tracking additional information associated with these transactions may be performed using off-chain techniques. For example, a transaction record database may operate in parallel with the blockchain, and transactions reflected in transaction records on the blockchain may be associated with a corresponding record in an off-chain transaction record database that records additional information beyond the sending party and receiving party for tokens or other digital assets transferred as part of a transaction. Without the use of a parallel off-chain transaction record database, the additional information associated with a transaction beyond the sending and receiving parties may not be tracked. Further, because one or both of the sending party or the receiving party may use wallets not owned directly by the sending party or the receiving party, respectively, but instead are owned by another party and operated on behalf of the sending party or the receiving party, the inclusion of wallet source and destination address information may remove information about the actual parties to a transaction from transactions records on the blockchain.

Still further, while some tokens and some blockchains may support the inclusion of additional content in a transaction record, the public nature of records on the blockchain and size constraints on transaction records on the blockchain may compromise the privacy of content associated with these transaction records and may limit the types of data that can be included in a transaction record. For example, messages stored in cleartext on the blockchain may clearly expose information about a transaction, such as the purpose of the transaction, digital and/or physical assets exchanged as part of a transaction, or the like, to any party having access to the blockchain. Further, the size of a transaction record on the blockchain may restrict the ability to include rich content, such as multimedia content, in a transaction record.

Aspects of the present disclosure provide techniques for efficiently and securely including content in a transaction record on the blockchain. Generally, information about a transaction to be performed on the blockchain, such as the actual parties involved in a transaction, assets exchanged via a transaction, and the like, may be received for processing. To allow for the transaction record for this transaction to securely include content beyond the sending wallet address, the destination wallet address, and tokens transferred in the transaction, the additional content (referred to herein as a message payload) may be encoded into a format that allows for the encoded message payload to be included in the transaction record. In some aspects, the encoded message payload may be encrypted based on keys associated with users associated with the source and destination wallets and a defined key generation scheme so that the users associated with the source and destination wallets can generate the keys used to encrypt and decrypt the message payload but other parties are unable to recover the keys used to encrypt and decrypt the message payload. By doing so, aspects of the present disclosure may improve the security of transaction records and content thereof on the blockchain and may allow for the inclusion of rich messaging or other content on the blockchain.

Example Secure Message Embedding in Transaction Records in Blockchain Systems

Figure 1:
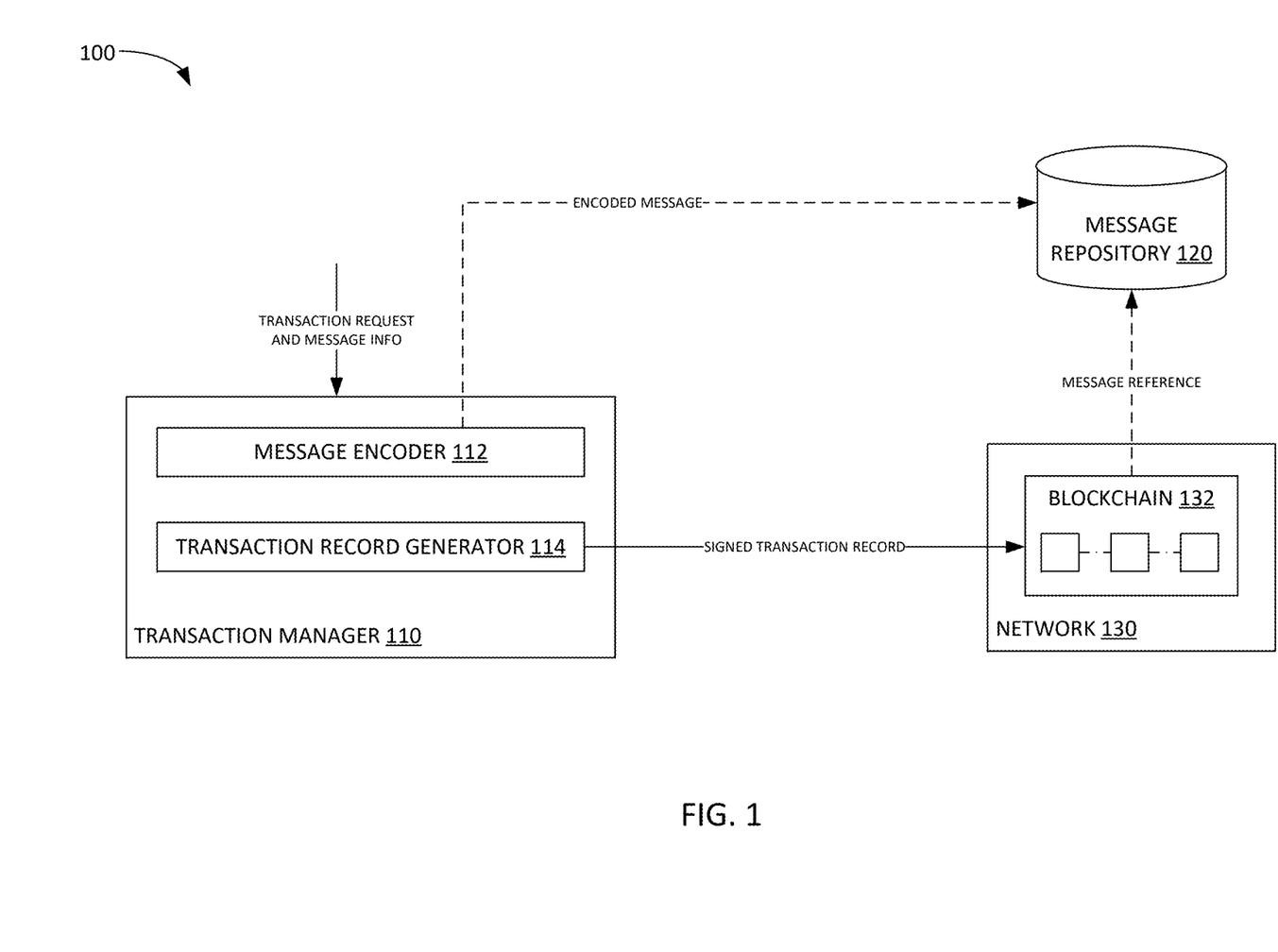
FIG. 1 depicts an example distributed computing environment in which messages are encoded for inclusion in transaction records stored on a blockchain, according to aspects of the present disclosure.

FIG. 1 illustrates an example computing environment 100 in which message payloads are securely embedded in transaction records committed to a blockchain. As illustrated, computing environment 100 includes a transaction manager 110, (optionally) a message repository 120, and a network 130.

Transaction manager 110 generally receives requests to process incoming transactions, encodes message payloads associated with these transaction requests into a format storable as part of a transaction record on the blockchain, and commits the transaction records to the blockchain. As illustrated, the transaction manager 110 includes a message encoder 112 and a transaction record generator 114.

Generally, to process a transaction and generate a transaction record that can be output to the blockchain 132 to evidence the occurrence of a transaction, the transaction manager 110 receives a transaction request including information about the source wallet from which tokens or other digital assets are to be withdrawn, a destination wallet to which the tokens or other digital assets are to be transferred, and a message payload. The message payload may be text, multimedia content, a file, or the like, and may describe the transaction performed between users associated with the source wallet and the destination wallet. For example, the message payload may be a receipt, an itemized invoice, or the like. In some aspects, the message payload may be a link or other reference to a transaction description located at a remote location, such as a message repository 120.

The message encoder 112 generally encodes the message payload included in the transaction request so that the message payload can be securely embedded in a transaction record committed to the blockchain 132. Generally, to encode a message payload, various techniques may be used to generate an encoded message payload that complies with a maximum size of a transaction record or message embedded therein, which may be defined for each blockchain or type of token used in a transaction. Generally, the message encoder 112 encodes the message payload using techniques that attempt to minimize, or at least reduce, the size of the message payload embedded in a transaction record committed to the blockchain 132. In doing so, the message encoder 112 can minimize, or at least reduce, the size of the transaction record itself, which may in turn reduce the computational and "gas" expenses of processing the transaction on the blockchain 132 (e.g., verifying the transaction).

In some aspects, the message encoder 112 can encode the message payload by compressing the message payload into a compressed representation of the message payload. The encoding may be performed using various techniques, such as encoding into a compressed archive, encoding into a latent space representation provided by an autoencoder-based compression scheme, or the like.

In some aspects, the message encoder 112 can encode the message payload by encrypting the message payload based on a shared encryption key that is derivable by the user associated with the source wallet and the user associated with the destination wallet based on keys owned by each user and a defined key derivation scheme. To allow for transaction records to be generated with message payloads encrypted by a variety of users, the message encoder 112 can support a variety of encryption schemes and key derivation schemes used to generate keys for encrypting a message payload. These encryption schemes and key derivation schemes may include any encryption scheme that generates encryption and decryption keys based on the public and/or private keys associated with the source and destination wallets, such as public key encryption, symmetric key encryption, and symmetric key encryption with shared key derivation from public keys. Thus, the transaction request may include metadata identifying an encryption scheme that the users associated with the source and destination wallets have agreed upon for encrypting (and correspondingly for decrypting) the message payload, as well as keys associated with the source and destination wallets based on which the encryption and decryption keys used to encrypt and decrypt the message payload may be derived.

Based on the metadata identifying the encryption scheme that the users associated with the source and destination wallets have agreed upon for encrypting the message payload, the message encoder 112 can retrieve signing keys associated with the users associated with the source and destination wallets. For example, the message encoder 112 can retrieve these signing keys, which may be the public key component of public-private key pairs associated with the source and destination wallets (or the users associated therewith) and use a key derivation function associated with the identified encryption scheme to generate a key used to encrypt the message payload. The key derivation function may be implemented via various libraries used by the message encoder to support the generation of encryption keys using a variety of encryption schemes. Examples of key derivation and encryption schemes that the message encoder 112 can use to generate an encryption key to use in encrypting the message payload may include, without limitation, Elliptic Curve Diffie-Hellman (ECDH) in which a shared secret is established based on elliptic public keys, Signal protocol or other double-ratcheting encryption schemes in which unique keys are derived for each message payload that is encrypted, or the like. In some aspects, the encryption scheme may be a symmetric encryption scheme in which the generated encryption key is used to both encrypt the message payload and decrypt the message payload.

In some aspects, the message payload may be a previously encrypted payload. The message encoder 112 may further encrypt the payload using a key derived from the public keys associated with users associated with the source and destination wallets so that the message payload is protected by two layers of encryption. By doing so, aspects of the present disclosure may allow for the message payload to be securely provided to the transaction manager 110 without exposing the message payload to the transaction manager 110, thus minimizing (or at least reducing) the risk that the privacy of the message content is compromised.

In some aspects, the message encoder 112 can monitor the size of the encrypted message payload to determine whether the message payload itself or a reference to the message payload is to be included in the transaction record evidencing the requested transaction output to the blockchain 132. Generally, when the size of the encrypted message payload exceeds a threshold size, such as a maximum size of a transaction record on a blockchain 132 (e.g., defined by the blockchain itself, by the specifications associated with a token transferred on the blockchain 132, etc.), the message encoder 112 may commit the encrypted message payload to a message repository 120 and generate a reference to the encrypted message payload for inclusion in the transaction record. The message repository 120 may be, for example, a message repository or other repository defined a priori by one or both of the user associated with the source wallet or user associated with the destination wallet, a common message repository 120 maintained for a variety of users by a party associated with the transaction manager 110, or the like. When the size of the encrypted message payload is equal to or below the threshold size, the encrypted message payload may be included in a transaction record committed to the blockchain 132. In some aspects, the threshold may be adjusted based on a current cost to perform a transaction on the blockchain 132 (sometimes referred to as a "gas fee"). In such a case, the threshold size may be set to a maximum size of a transaction record when the current cost to perform transactions on the blockchain 132 is at or below a threshold cost, and the threshold size may be reduced as the current cost to perform transactions on the blockchain 132 increases.

Encoding of a message payload by the message encoder 112 may thus allow for information to be securely embedded into a transaction record evidencing a transaction performed on a blockchain 132. The message payload may include information about the end users associated with the source and destination wallets between which tokens or other digital assets are transferred, which may allow for the use of platform-controlled wallets in transactions performed on a blockchain 132 while allowing for the end users associated with these platform-controlled wallets to determine that a specific transaction is between specific users (e.g., by being able to decrypt the message payload into an intelligible unencrypted payload, as other users who are unaware of the encryption scheme associated with the encrypted message payload and/or the keys used to encrypt the encrypted message payload may not be able to decrypt the message payload or may generate unintelligible data when attempting to decrypt the message payload. Further, the encoding of the message payload may provide for the security of the message payload, as the encrypted version of the message payload may be included in the transaction record on the blockchain.

The message encoder 112 may execute in various manners to encode a message payload for inclusion in a transaction record broadcast to the blockchain 132. In some aspects, the message encoder 112 may interact directly with a smart contract that encodes message payloads for broadcast to the blockchain 132. In some aspects, the message encoder 112 may interact with smart contracts that process transactions encoded by the message encoder and subsequently executes functions on a smart contract associated with a token used in a transaction associated with the message payload.

The transaction record generator 114 generates a transaction record evidencing the requested transaction based on the specified amount of tokens (or other digital assets) involved in the transaction, the source wallet from which tokens or other digital assets are to be transferred, the destination wallet to which the tokens or other digital assets are to be transferred, and the encoded (e.g., encrypted) message payload generated by the message encoder 112. After generating the transaction record, the transaction record generator 114 can sign the transaction record using one or more signing keys (e.g., public keys associated with a party initiating the transaction) and commit the signed transaction record (including an encoded message payload which may, as illustrated, include a reference to data in the message repository 120 illustrated in FIG. 1) to the blockchain 132. For example, to generate the transaction record, the transaction record generator 114 can invoke one or more functions implemented by a smart contract or other programmatic construct on the blockchain 132 to initiate a transfer of tokens or other digital assets from a source wallet to a destination wallet. The transaction record may be generated, for example, as part of invoking the one or more functions implemented by the smart contract or other programmatic construct on the blockchain 132.

Generally, the encoding of a message payload and generation of a transaction record evidencing a transaction performed on a blockchain 132 may be performed in any order and may be performed as a single transaction (e.g., an atomic transaction in which encoding of the message payload and generation of the transaction record including the encoded message payload is performed as an all-or-nothing operation in which the operation succeeds only when the encoding of the message payload and the generation of the transaction record are both successfully performed). In doing so, functions exposed by a smart contract or other programmatic construct on the blockchain may encapsulate existing functions that implement a transfer of tokens from the source wallet to the distribution function and invoke such a function based on successfully generating a signing key and encoding the message payload based on the generated signing key.

Network 130 may, in some aspects, be a cryptocurrency network for which transaction manager 110 processes transactions. By way of example, network 130 may be a network such as ALGORAND™, BITCOIN™, ETHEREUM®, SOLANA™, STELLAR™, and other cryptocurrency networks. Transactions on a blockchain 132 hosted by network 130 may include, for example, the execution of one or more smart contracts on the blockchain 132 or by the generation of one or more blocks on the blockchain evidencing the occurrence of a transaction on the blockchain 132.

Figure 2A:
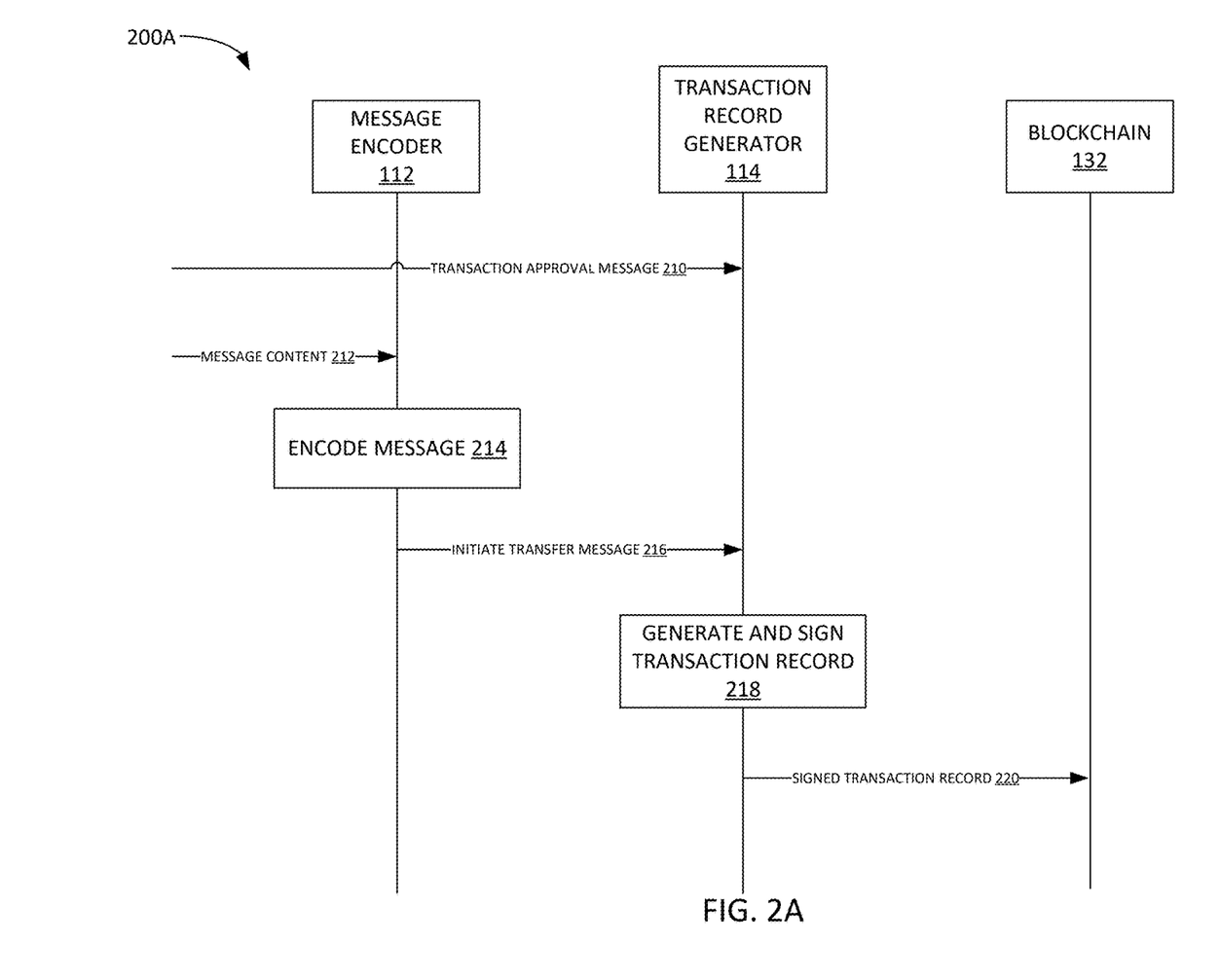
FIGS. 2A-2C depict examples of messages exchanged between a message signer and a transaction record generator for performing transactions on a blockchain and embedding encoded messages into transaction records associated with the transactions performed on the blockchain, according to aspects of the present disclosure.
Figure 2B:
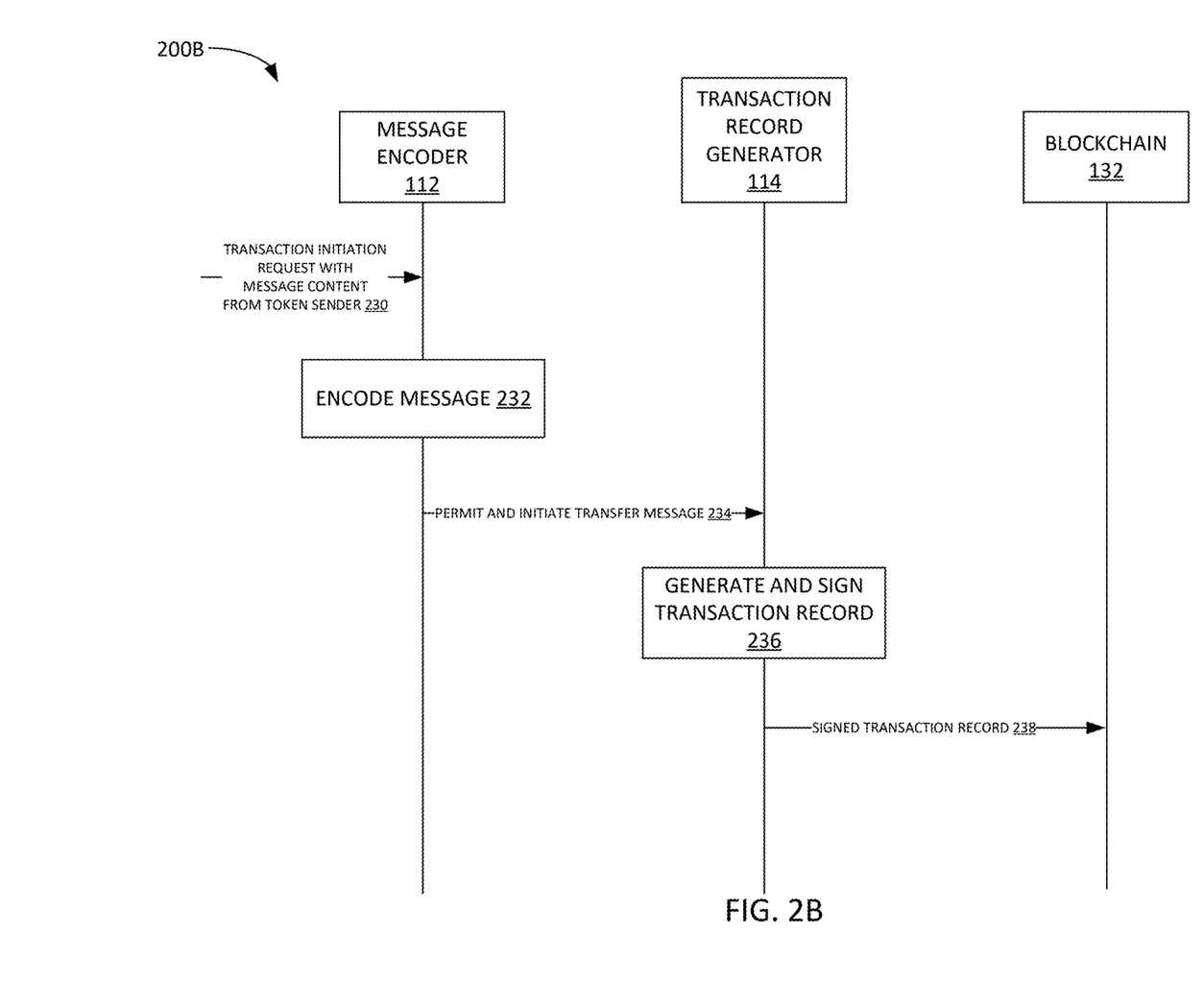
Figure 2C:
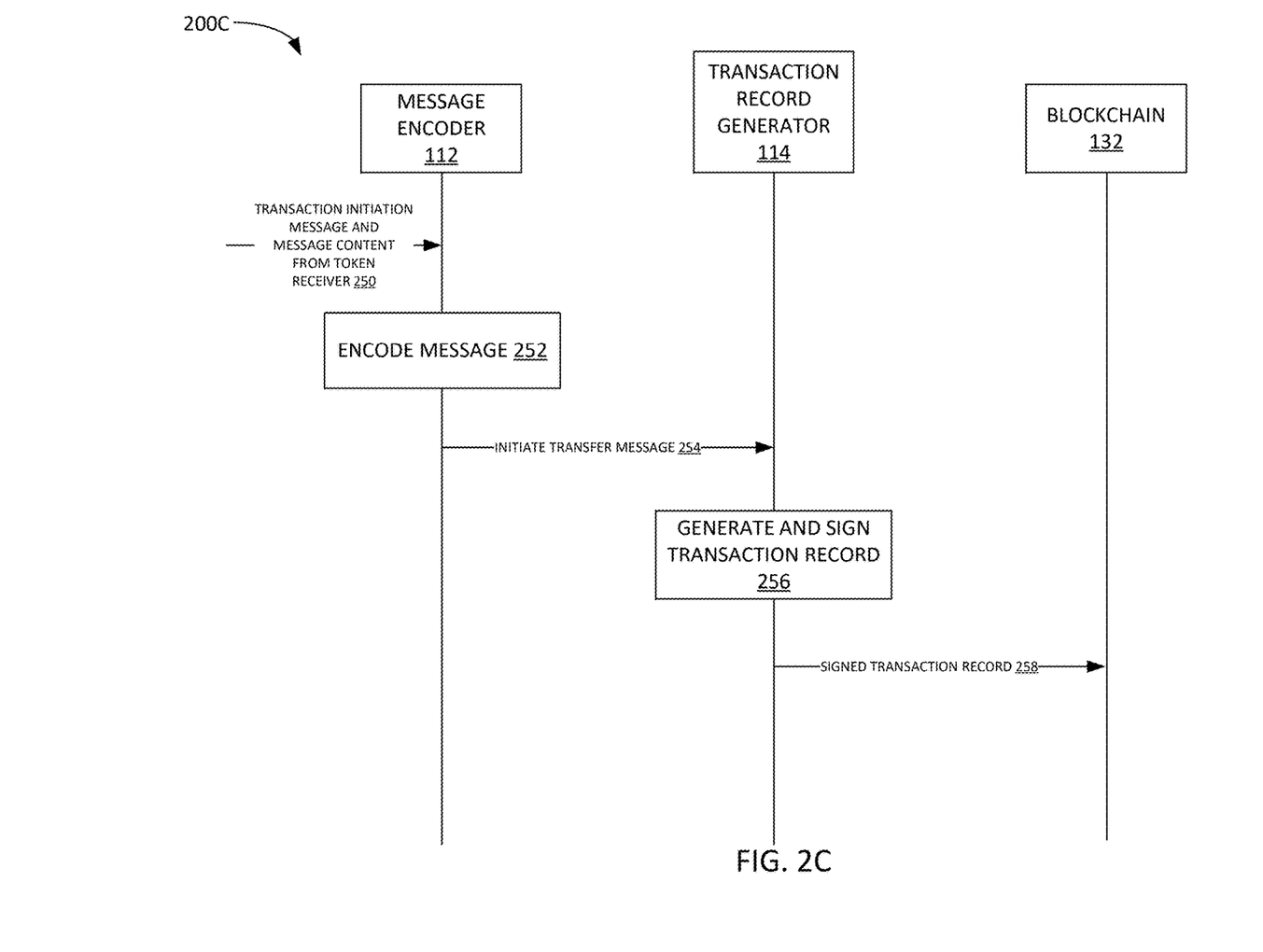

Example Secure Message Embedding in Transactions Records for Transactions Performed on a Blockchain FIGS. 2A-2C illustrate examples of performing transactions on a blockchain (e.g., the blockchain 132 illustrated in FIG. 1) and generating transaction records associated with these transactions including an embedded message, according to aspects of the present disclosure. In the examples illustrated in FIGS. 2A-2C, the message encoder 112 and the transaction record generator 114 may be implemented as separate smart contracts or other programmatic constructs that execute on the blockchain; however, it should be understood that the encoding of a message payload (or other content) associated with a transaction and the generation of transaction records associated with the transaction may be integrated into a same smart contract or other programmatic construct or may be performed using separate memory pools on the blockchain.

FIG. 2A illustrates an example 200A in which a transaction is initiated by a user associated with a destination wallet. In the example 200A, the transaction may be initiated by the user associated with the destination wallet transmits a transaction approval message 210 to the transaction record generator 114, according to aspects of the present disclosure. Generally, the transaction approval message 210 may indicate that the message encoder 112 is the party that is to initiate the transaction and identify an amount of tokens or other digital assets to be transferred from a source wallet to the destination wallet as part of the transaction.

Subsequently, the message encoder 112 may be invoked by providing message content 212 to the message encoder 112 for processing. The message content 212, as discussed, may include information about the transaction, such as information about the sending and receiving parties, information about tokens or other digital assets transferred as part of the transaction, and the like. In some aspects, the message content may be a reference to a record of the transaction stored in an external repository.

At block 214, the message encoder 112 encodes the message content 212 into an encoded payload for inclusion in a transaction record evidencing a transaction performed on the blockchain. As discussed, to encode the message content 212, the message encoder 112 derives an encryption key for the message content 212 based on a specified encryption scheme and key derivation scheme. Generally, the message encoder 112 retrieves, based on the encryption scheme associated with the message payload and identified in metadata included in the transaction approval message 210, keys associated with a user associated with the source wallet and a user associated with the destination wallet in order to generate the encryption key for encoding (e.g., encrypting) the message content 212 for secure and privacy-preserving inclusion on the blockchain 132. Generally, for symmetric key encryption, the shared private key associated with the source and destination wallets may be derived; for public key encryption, a public key for the user associated with the destination wallet may be retrieved or otherwise derived; for encryption based on a double ratcheting mechanism, a private key for the user associated with the source wallet and a public key for the user associated with the destination wallet may be used to derive the encryption key. The message encoder 112 can then encrypt the message payload using the generated encryption key.

After the message encoder 112 encodes the message content 212 at block 214, the message encoder 112 transmits an initiate transfer message 216 to the transaction record generator 114. In some aspects, the initiate transfer message 216 may be transmitted as a request to invoke a transfer function on the blockchain 132 in order to transfer the amount of tokens specified in the transaction approval message 210 from the source wallet to the destination wallet identified in the transaction approval message 210. In response to receiving the initiate transfer message 216, the transaction record generator 114 generates and signs a transaction record at block 218. Generally, in generating and signing the transaction record, the transaction record generator 114 may invoke a function to transfer tokens or other digital assets from the source wallet to the destination wallet according to the specified amount of tokens or other digital assets, the source wallet, and the destination wallet in the transaction approval message 210. The signed transaction record generated at block 218 may include the encoded message content generated by the message encoder 112. The signed transaction record 220 may be output to the blockchain 132 for further processing (e.g., verification, final commitment to an immutable ledger upon verification, etc.).

FIG. 2B illustrates an example 200B in which a transaction is initiated by a user associated with a source wallet (e.g., based on a pre-signed approval message identifying the source and destination wallets and the amount of tokens or other digital assets to be transferred in a transaction), according to aspects of the present disclosure. The pre-signed approval message may be, for example, an ERC-2612 permit message, an EIP-3009 transferWithAuthorization message, or the like.

As illustrated in example 200B, execution of a transaction may be initiated by receiving, at the message encoder 112, a transaction initiation request 230. Generally, the transaction initiation request may include message content to be encoded and included in a transaction record and a pre-signed approval message, and the transaction initiation request 230 may be initiated by a token sender.

In response to receiving the request to initiate a transaction, the message encoder 112 encodes the message content at block 232. Similar to the encoding of message content discussed with respect to block 214 illustrated in FIG. 2A, the message encoder 112 uses the information identifying the users associated with the source wallet and the destination wallet (which, as discussed, may be different from the owner or controlling party of the source wallet and the destination wallet, as the source wallet and/or the destination wallet may be wallets that are controlled by a platform for the users associated with the source wallet and/or destination wallet) to retrieve the public keys associated with these users to generate an encryption key to be used in encoding the message content. The message encoder 112 can then encrypt the message payload using the generated encryption key.

After the message content has been encoded, the message encoder 112 transmits a permit and initiate transfer message 234 to the transaction record generator 114. The permit and initiate transfer message 234 generally provides the pre-signed approval message received from the user in the transaction initiation request 230 to a smart function or other programmatic construct on the blockchain 132 to provide the approval message to the blockchain. Subsequently, the message encoder 112 invokes a transfer of the amount of tokens or other digital assets specified in the transaction initiation request from the specified source wallet to the specified destination wallet in the transaction initiation request 230. The transaction record generator 114, in turn, generates a transaction record evidencing the transaction on the blockchain 132 and includes the encoded message content in the transaction record. After generating the transaction record and signing the transaction record with an appropriate signing key, the transaction record generator 114 outputs the signed transaction record 238 to the blockchain 132 for further processing.

FIG. 2C illustrates an example 200C in which a transaction is initiated by a user associated with a destination wallet (e.g., based on a pre-signed approval message identifying the source and destination wallets and the amount of tokens other digital assets to be transferred in a transaction), according to aspects of the present disclosure.

As illustrated, the example 200C begins with the reception of a transaction initiation message 250 from the intended recipient of the tokens or other digital assets to be transferred by the transaction. Generally, the transaction initiation message 250 may include message content to be encoded and included in a transaction record evidencing the transaction on the blockchain 132 and may include a pre-signed approval message from the user associated with the source wallet for the tokens. The pre-signed approval message may be received at the message encoder 112 as content forwarded to the message encoder 112 by the user associated with the destination wallet.

At block 252, the message encoder encodes (e.g., encrypts) the message content included in the transaction initiation message 250. Similar to the encoding of message content discussed with respect to block 214 illustrated in FIG. 2A and block 232 illustrated in FIG. 2B, the message encoder 112 uses the information identifying the users associated with the source wallet and the destination wallet (which, as discussed, may be different from the owner or controlling party of the source wallet and the destination wallet, as the source wallet and/or the destination wallet may be wallets that are controlled by a platform for the users associated with the source wallet and/or destination wallet) to retrieve the public keys associated with these users to generate an encryption key to be used in encoding the message content. The message encoder 112 can then encrypt the message payload using the generated encryption key.

After the message content has been encoded, the message encoder 112 transmits an initiate transfer message 254 to the transaction record generator 114. The initiate transfer message 254 generally provides the pre-signed approval message received from the user in the transaction initiation message 250 to a smart function or other programmatic construct on the blockchain 132 to provide the approval message to the blockchain. Subsequently, the message encoder 112 invokes a transfer of the amount of tokens or other digital assets specified in the transaction initiation request from the specified source wallet to the specified destination wallet in the transaction initiation message 250. The transaction record generator 114, in turn, generates a transaction record evidencing the transaction on the blockchain 132 and includes the encoded message content in the transaction record. After generating the transaction record and signing the transaction record with an appropriate signing key, the transaction record generator 114 outputs the signed transaction record 258 to the blockchain 132 for further processing.

Figure 3:
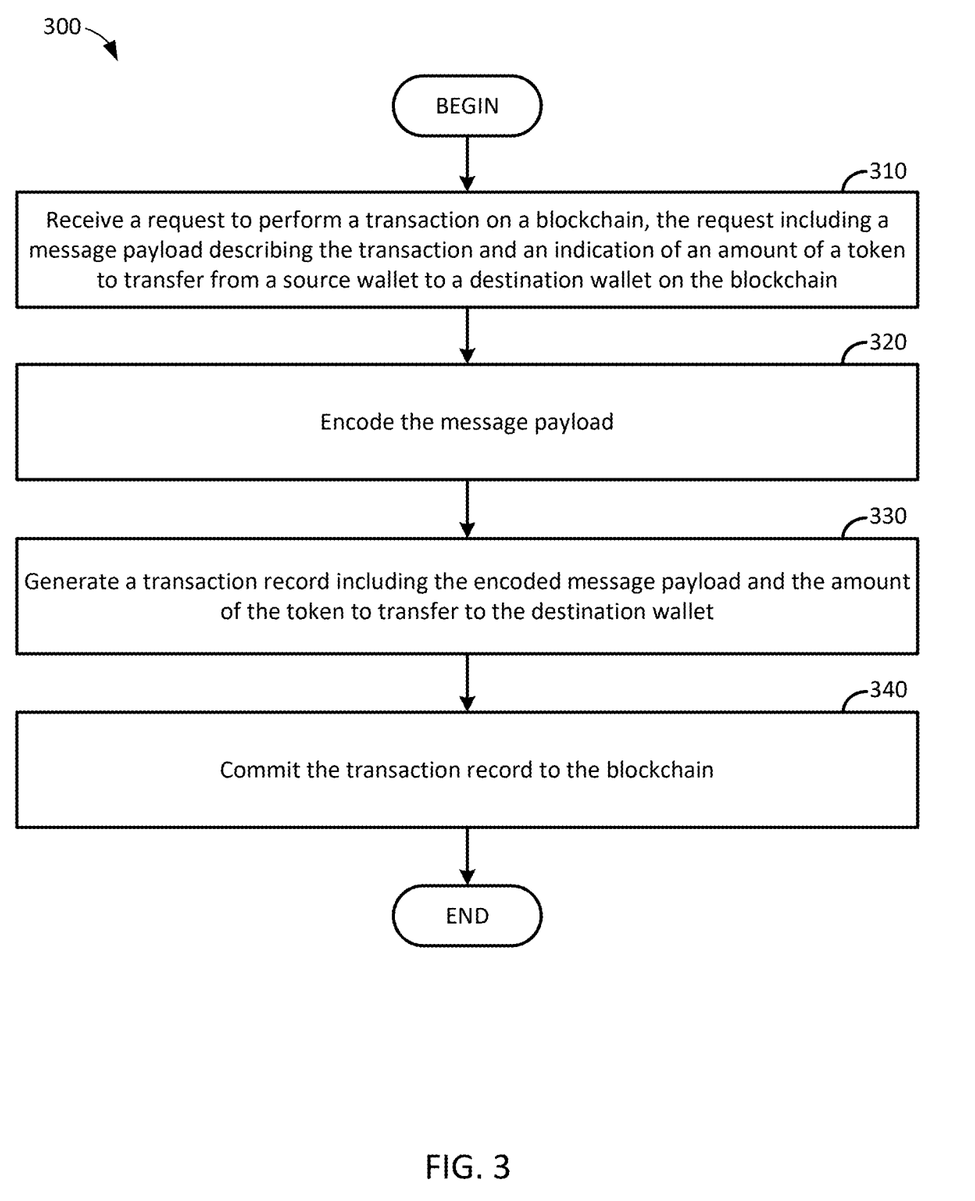
FIG. 3 illustrates example operations for executing transactions in a distributed computing system with transaction records including encoded message content, according to aspects of the present disclosure.

Example Operations for Secure Message Embedding in Transaction Records for Transactions Performed on a Blockchain FIG. 3 illustrates example operations 300 for securely embedding messages in transaction records for transactions performed on a blockchain, according to aspects of the present disclosure. The operations 300 may be performed, for example, by a transaction manager, such as the transaction manager 110 illustrated in FIG. 1 or other computing system that can receive and process transaction requests including a message payload for transactions to be performed on a blockchain.

As illustrated, the operations 300 begin at block 310, with receiving a request to perform a transaction on a blockchain. Generally, the request includes a message payload describing the transaction and an indication of an amount of a token to transfer from a source wallet to a destination wallet on the blockchain.

At block 320, the operations 300 proceed with encoding the message payload. Generally, the encoded message payload has a maximum size associated with a block size on the blockchain.

In some aspects, encoding the message payload comprises encrypting the message payload based on an encryption key shared between a user associated with a sending wallet on the blockchain and a user associated with the destination wallet on the blockchain. In some aspects, the encryption key comprises a key derived from a public key associated with the user associated with the sending wallet on the blockchain and a public key associated with the user associated with the destination wallet on the blockchain. As discussed, the encryption key may be derived using a variety of key derivation schemes which may be agreed upon by the user associated with the sending wallet and the user associated with the destination wallet. For example, the encryption key may be derived as a symmetric key using the public keys associated with the users associated with the sending wallet and the destination wallet on the blockchain. In some aspects, the symmetric key may further be derived based on a base key that may be different for different transactions (e.g., such that the encryption key is generating using a ratcheting key derivation function).

In some aspects, encoding the message payload comprises generating a reference to the message payload, the reference pointing to an off-blockchain data repository. The reference to the message payload may be, for example, an a priori defined link to a message payload committed to the off-blockchain data repository provided by one of the user associated with the sending wallet or the user associated with the destination wallet. In some aspects, a reference to the message payload may be generated when the message payload or the encrypted version thereof exceeds a maximum defined size for a transaction record or other payload data in a record stored on the blockchain or some other threshold size (e.g., a threshold size that varies based on the current cost to perform a transaction on the blockchain). In such a case, the encrypted message payload may be stored in an off-blockchain data repository, and the link to the encrypted message payload may be generated and encrypted using an encryption scheme specified in the received request, the public keys associated with the users associated with the source and destination wallets, and a defined key derivation function for the specified encryption scheme. In some aspects, encoding the message payload further comprises encrypting the reference to the message payload based on an encryption key shared between a user associated with a sending wallet on the blockchain and a user associated with the destination wallet on the blockchain.

At block 330, the operations 300 proceed with generating a transaction record including the encoded message payload and the amount of the token to transfer to the destination wallet.

At block 340, the operations 300 proceed with committing the transaction record to the blockchain.

In some aspects, at least one of the source wallet or the destination wallet are associated with a wallet managed by a wallet management platform. A wallet managed by a wallet management platform may be a wallet that is owned and publicly associated on the blockchain with the wallet management platform but is owned and managed for another user.

In some aspects, the operations 300 further include retrieving public keys associated with at least one of the source wallet or the destination wallet from the wallet management platform, wherein the message payload is encoded based on the retrieved public keys. The keys associated with the wallet and retrieved from the wallet management platform may allow for a transaction to be associated with wallets on the wallet management platform and may allow the end user associated with a wallet managed by the wallet management platform to not have to provide that user's wallet public key to a transaction manager separately.

In some aspects, the transaction request includes metadata describing an encryption scheme used to encode the message payload and information identifying the public keys associated with the source wallet and the destination wallet.

In some aspects, the request is received by invoking a function on the blockchain that executes the encoding, generating, and committing as a single operation. In such a case, a smart contract defining a token transferred as part of the request may include this function.

In some aspects, committing the transaction record to the blockchain comprises invoking a first function to transfer the amount of the token from the source wallet to the destination wallet and a second function to commit the encoded message payload to the blockchain, and wherein the first function and the second function are executed atomically. In doing so, the transaction record and message payload may be processed separately (e.g., on separate memory pools associated with a blockchain), and both the transaction and the message payload may be posted atomically to the blockchain.

In some aspects, the request is processed by a function on the blockchain that executes the encoding and generating and invokes another function that transfers the amount of the token from the source wallet to the destination wallet based on a token spending allowance defined by a user associated with the source wallet.

Figure 4:
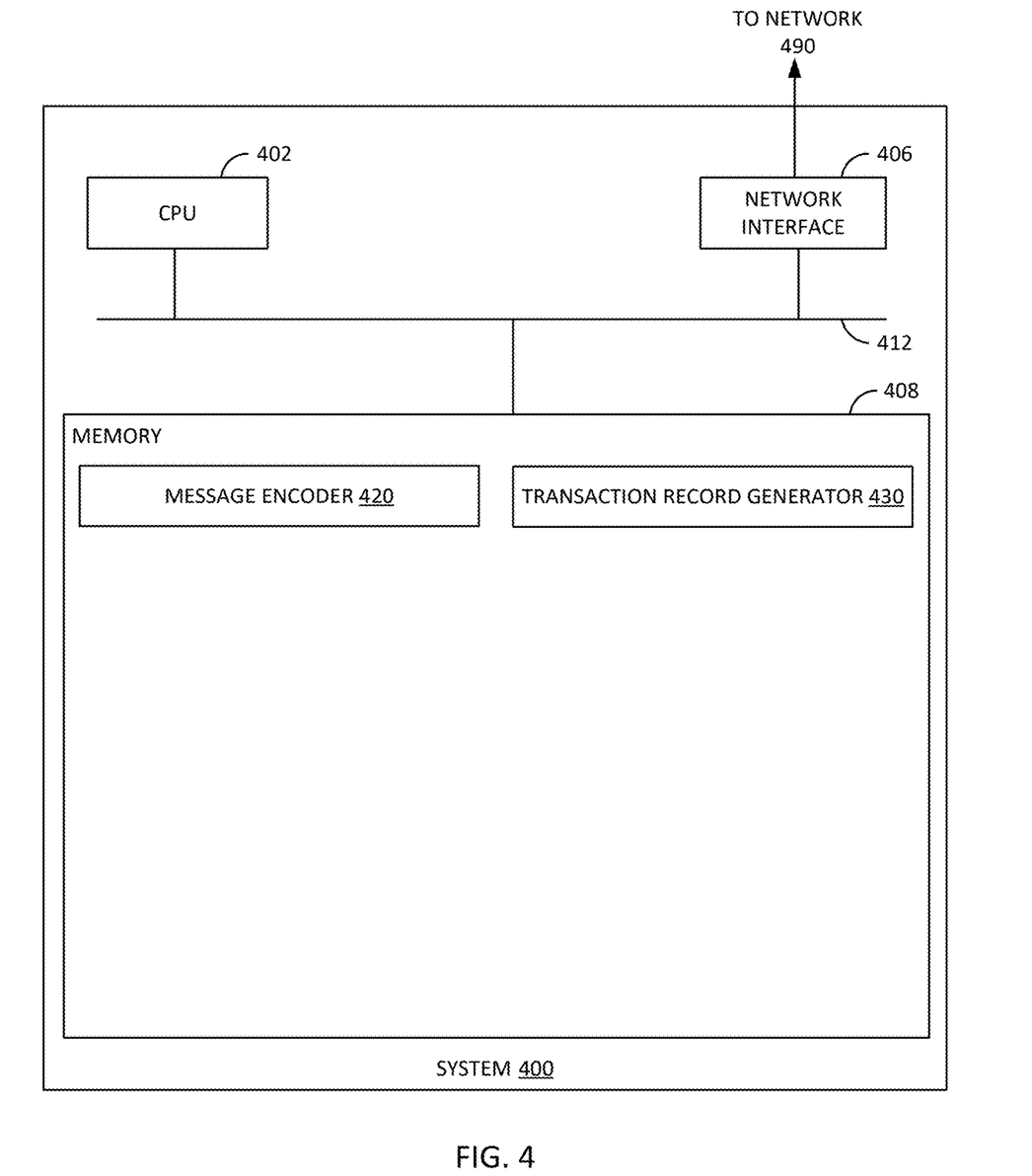
FIG. 4 illustrates an example system on which embodiments of the present disclosure can be performed.

Example System for Secure Message Embedding in Transaction Records for Transactions Performed on a Blockchain FIG. 4 illustrates an example system 400 configured to perform the methods described herein, including, for example, operations 300 illustrated in FIG. 3. In some embodiments, system 400 may act as a transaction manager through which transaction requests including message payloads are processed with corresponding transaction records being committed to a blockchain, such as transaction manager 110 illustrated in FIG. 1.

As shown, system 400 includes a central processing unit (CPU) 402, network interface 406 through which system 400 is connected to network 490 (which may be a local network, an intranet, the internet, or any other group of computing devices communicatively connected to each other), a memory 408, and an interconnect 412. The network interface 406 may be used to receive requests to perform transactions on the blockchain and accompanying message payloads to include in records evidencing these transactions on the blockchain (e.g., as depicted and described with respect to FIGS. 1 through 3.

CPU 402 may retrieve and execute programming instructions stored in the memory 408. Similarly, the CPU 402 may retrieve and store application data residing in the memory 408. The interconnect 412 transmits programming instructions and application data, among the CPU 402, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a message encoder 420 and a transaction record generator 430.

The message encoder 420 generally corresponds to the message encoder 112 illustrated in FIG. 1. Generally, the message encoder 420 receives a message payload or other content to be included in a transaction record associated with a transaction performed on the blockchain and encodes the message payload into an encoded version that complies with a size threshold for transaction records on the blockchain. In some aspects, the message encoder 420 may compress the message payload and/or generate an encrypted version of the message payload based on public keys associated with the source and destination wallets (or the users associated therewith) identified in a transaction request. The encryption key used to generate an encrypted version of the message payload may be generated based on a key derivation function associated with an encryption scheme specified in the transaction request received at the system 400 and may be a symmetric key that is used for both encryption of the message payload and decryption of the encrypted version of the message payload.

The transaction record generator 430 generally corresponds to the transaction record generator 114 illustrated in FIG. 1. Generally, the transaction record generator uses the transaction information received in a transaction request (e.g., identity of the source and destination wallets, an amount of tokens or other digital assets to transfer, etc.) to perform a transaction on the blockchain and generate and commit to the blockchain a transaction record evidencing the transaction. Generally, the transaction record generated and committed to the blockchain by the transaction record generator 430 includes an encoded version of a message payload included in the transaction request and generated by the message encoder 420.

Example Clauses

Implementation details for various aspects of the present disclosure are described in the following numbered clauses.

Clause 1: A processor-implemented method, comprising: receiving a request to perform a transaction on a blockchain, the request including a message payload describing the transaction and an indication of an amount of a token to transfer from a source wallet to a destination wallet on the blockchain; encoding the message payload, wherein the encoded message payload has a maximum size associated with a block size on the blockchain; generating a transaction record including the encoded message payload and the amount of the token to transfer to the destination wallet; and committing the transaction record to the blockchain.

Clause 2: The method of Clause 1, where encoding the message payload comprises encrypting the message payload based on an encryption key shared between a user associated with a sending wallet on the blockchain and a user associated with the destination wallet on the blockchain.

Clause 3: The method of Clause 2, wherein the encryption key comprises a key derived from a public key associated with the user associated with the sending wallet on the blockchain and a public key associated with the user associated with the destination wallet on the blockchain.

Clause 4: The method of any one of Clauses 1 through 3, where encoding the message payload comprises generating a reference to the message payload, the reference pointing to an off-blockchain data repository.

Clause 5: The method of Clause 4, wherein encoding the message payload further comprises encrypting the reference to the message payload based on an encryption key shared between a user associated with a sending wallet on the blockchain and a user associated with the destination wallet on the blockchain.

Clause 6: The method of any one of Clauses 1 through 5, wherein at least one of the source wallet or the destination wallet are associated with a wallet managed by a wallet management platform.

Clause 7: The method of Clause 6, further comprising retrieving public keys associated with at least one of the source wallet or the destination wallet from the wallet management platform, wherein the message payload is encoded based on the retrieved public keys.

Clause 8: The method of any one of Clauses 1 through 7, wherein the request further includes metadata describing an encryption scheme used to encode the message payload and information identifying the public keys associated with the source wallet and the destination wallet.

Clause 9: The method of any one of Clauses 1 through 8, wherein the request is received by invoking a function on the blockchain that executes the encoding, generating, and committing as a single operation.

Clause 10: The method of any one of Clauses 1 through 9, wherein committing the transaction record to the blockchain comprises invoking a first function to transfer the amount of the token from the source wallet to the destination wallet and a second function to commit the encoded message payload to the blockchain, and wherein the first function and the second function are executed atomically.

Clause 11: The method of any one of Clauses 1 through 10, wherein the request is processed by a function on the blockchain that executes the encoding and generating and invokes another function that transfers the amount of the token from the source wallet to the destination wallet based on a token spending allowance defined by a user associated with the source wallet.

Clause 12: A system, comprising: a memory having executable instructions stored thereon; and a processor configured to execute the executable instructions to perform the operations of any one of Clauses 1 through 11.

Clause 13: A system, comprising: means for performing the operations of any one of Clauses 1 through 11.

Clause 14: A computer-readable medium having instructions stored thereon which, when executed by a processor, performs the operations of any one of Clauses 1 through 11.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
   receiving a request to perform a transaction on a blockchain, the request including a message payload describing the transaction and an indication of an amount of a token to transfer from a source wallet to a destination wallet on the blockchain;
   encoding the message payload, wherein the encoded message payload has a maximum size correspondinq to a threshold that is set based on a block size on the blockchain;
   generating a transaction record including the encoded message payload and the amount of the token to transfer to the destination wallet; and
   committing the transaction record to the blockchain.

2. The method of claim 1, where encoding the message payload comprises encrypting the message payload based on an encryption key shared between a user associated with a sending wallet on the blockchain and a user associated with the destination wallet on the blockchain.

3. The method of claim 2, wherein the encryption key comprises a key derived from a public key associated with the user associated with the sending wallet on the blockchain and a public key associated with the user associated with the destination wallet on the blockchain.

4. The method of claim 1, where encoding the message payload comprises generating a reference to the message payload, the reference pointing to an off-blockchain data repository.

5. The method of claim 4, wherein encoding the message payload further comprises encrypting the reference to the message payload based on an encryption key shared between a user associated with a sending wallet on the blockchain and a user associated with the destination wallet on the blockchain.

6. The method of claim 1, wherein at least one of the source wallet or the destination wallet are associated with a wallet managed by a wallet management platform.

7. The method of claim 6, further comprising retrieving public keys associated with at least one of the source wallet or the destination wallet from the wallet management platform, wherein the message payload is encoded based on the retrieved public keys.

8. The method of claim 7, wherein the request further includes metadata describing an encryption scheme used to encode the message payload and information identifying the public keys associated with the source wallet and the destination wallet.

9. The method of claim 1, wherein the request is received by invoking a function on the blockchain that executes the encoding, generating, and committing as a single operation.

10. The method of claim 1, wherein committing the transaction record to the blockchain comprises invoking a first function to transfer the amount of the token from the source wallet to the destination wallet and a second function to commit the encoded message payload to the blockchain, and wherein the first function and the second function are executed atomically.

11. The method of claim 1, wherein the request is processed by a function on the blockchain that executes the encoding and generating and invokes another function that transfers the amount of the token from the source wallet to the destination wallet based on a token spending allowance defined by a user associated with the source wallet.

12. A processing system, comprising:
at least one memory having executable instructions stored thereon; and
one or more processors configured to execute the executable instructions to cause the processing system to:
receive a request to perform a transaction on a blockchain, the request including a message payload describing the transaction and an indication of an amount of a token to transfer from a source wallet to a destination wallet on the blockchain;
encode the message payload, wherein the encoded message payload has a maximum size corresponding to a threshold that is set based on a block size on the blockchain;
generate a transaction record including the encoded message payload and the amount of the token to transfer to the destination wallet; and
commit the transaction record to the blockchain.

13. The processing system of claim 12, where to encode the message payload, the one or more processors are configured to cause the processing system to encrypt the message payload based on an encryption key shared between a user associated with a sending wallet on the blockchain and a user associated with the destination wallet on the blockchain.

14. The processing system of claim 13, wherein the encryption key comprises a key derived from a public key associated with the user associated with the sending wallet on the blockchain and a public key associated with the user associated with the destination wallet on the blockchain.

15. The processing system of claim 12, where to encode the message payload, the one or more processors are configured to cause the processing system to generate a reference to the message payload, the reference pointing to an off-blockchain data repository.

16. The processing system of claim 15, wherein to encode the message payload, the one or more processors are further configured to cause the processing system to encrypt the reference to the message payload based on an encryption key shared between a user associated with a sending wallet on the blockchain and a user associated with the destination wallet on the blockchain.

17. The processing system of claim 12, wherein at least one of the source wallet or the destination wallet are associated with a wallet managed by a wallet management platform.

18. The processing system of claim 17, wherein the one or more processors are further configured to cause the processing system to retrieve public keys associated with at least one of the source wallet or the destination wallet from the wallet management platform, wherein the message payload is encoded based on the retrieved public keys.

19. The processing system of claim 18, wherein the request further includes metadata describing an encryption scheme used to encode the message payload and information identifying the public keys associated with the source wallet and the destination wallet.

20. The processing system of claim 12, wherein the request is received by invoking a function on the blockchain that executes the encoding, generating, and committing as a single operation.

21. The processing system of claim 12, wherein committing the transaction record to the blockchain comprises invoking a first function to transfer the amount of the token from the source wallet to the destination wallet and a second function to commit the encoded message payload to the blockchain, and wherein the first function and the second function are executed atomically.

22. The processing system of claim 12, wherein the request is processed by a function on the blockchain that executes the encoding and generating and invokes another function that transfers the amount of the token from the source wallet to the destination wallet based on a token spending allowance defined by a user associated with the source wallet.

23. A non-transitory computer-readable medium having executable instructions stored thereon which, when executed by one or more processors, performs an operation comprising:
receiving a request to perform a transaction on a blockchain, the request including a message payload describing the transaction and an indication of an amount of a token to transfer from a source wallet to a destination wallet on the blockchain;
encoding the message payload, wherein the encoded message payload has a maximum size correspondinq to a threshold that is set based on a block size on the blockchain;
generating a transaction record including the encoded message payload and the amount of the token to transfer to the destination wallet; and
committing the transaction record to the blockchain.

* * * * *